United States Patent
Ozaki et al.

[11] Patent Number: 5,889,619
[45] Date of Patent: Mar. 30, 1999

[54] ZOOM LENS SYSTEM

[75] Inventors: Hiroyasu Ozaki; Takayuki Ito, both of Tokyo, Japan

[73] Assignee: Asahi Kogaku Kogyo Kabushiki Kaisha, Tokyo, Japan

[21] Appl. No.: 786,899

[22] Filed: Jan. 23, 1997

[30] Foreign Application Priority Data

Jan. 29, 1996 [JP] Japan .................................... 8-013386

[51] Int. Cl.$^6$ .................................................. G02B 15/14
[52] U.S. Cl. ........................................... 359/688; 359/683
[58] Field of Search .................... 359/688, 683, 359/685

[56] References Cited

U.S. PATENT DOCUMENTS

| | | | |
|---|---|---|---|
| 4,491,395 | 1/1985 | Okudaira | 359/688 |
| 5,221,995 | 6/1993 | Yaneyama | 359/688 |

FOREIGN PATENT DOCUMENTS

| | | |
|---|---|---|
| 7110447 | 4/1992 | Japan . |
| 4342217 | 11/1992 | Japan . |
| 6-175022 | 6/1994 | Japan . |

*Primary Examiner*—Georgia Epps
*Assistant Examiner*—Jordan M. Schwartz
*Attorney, Agent, or Firm*—Sughrue, Mion, Zinn, Macpeak & Seas, PLLC

[57] ABSTRACT

There are arranged, in order from the object side, a first lens group having positive refractive power, a second lens group having negative refractive power, a third lens group having negative refractive power, and a fourth lens group having positive refractive power, the first and fourth lens groups being fixed whereas the second and third lens groups are moved in the axial direction to effect zooming. Further, the following conditions (1), (2) and (3) are satisfied:

(1) $1.2 < H_{4MAX}/H_{4-I} < 1.6$ (2) $0.3 < f_T/f_1 < 1.0$ (3) $0.35 < |f_W/f_2| < 0.70$ where $H_{4MAX}$ is the maximum height of the axial ray through the fourth lens group, $H_{4-I}$ is the height of the axial ray intercept at lens element 4–1 in the fourth lens group which is located closest to the object side, $f_T$ is the focal length of the overall system at the telephoto end, $f_W$ is the focal length of the overall system at the wide-angle end, $f_1$ is the focal length of the first lens group, and $f_2$ is the focal length of the second lens group.

9 Claims, 8 Drawing Sheets

ZOOM LENS SYSTEM

BACKGROUND OF THE INVENTION

This application is based on and claims priority from Japanese Patent Application No. Hei. 8-13386, filed Jan. 29, 1996, the disclosure of which is incorporated by reference herein.

TECHNICAL FIELD

The present invention relates to a zoom lens system having an F number of about 2 and a zoom ratio of about 5 which is suitable for use in color video cameras and digital cameras.

PRIOR ART AND ITS PROBLEMS

Video cameras and digital cameras for color photography are commonly of a "multi-CCD" type in which color-separated light beams are input to different CCDs. In the multi-CCD camera, thick optical members such as a color separation prism or color filters are provided behind the imaging lens and this arrangement requires a long back focus. Another requirement is a zoom lens system which has a large zoom ratio and yet experiences small changes in optical performance during zooming.

OBJECTS AND SUMMARY OF THE INVENTION

An object, therefore, of the present invention is to provide a zoom lens system which ensures a long back focus and yet has a large zoom ratio while exhibiting high optical performance over the entire zooming range.

Another object of the invention is to provide a zoom lens system which has small distortion and yet experiences a small change in distortion during zooming.

These and other objects are achieved by a zoom lens system of a four-group type which comprises, in order from the object side, a first lens group having positive refractive power, a second lens group having negative refractive power, a third lens group having negative refractive power, and a fourth lens group having positive refractive power, said first and fourth lens groups being fixed whereas said second and third lens groups are moved in the axial direction to effect zooming. The zoom lens system of the invention is characterized by satisfying the following conditions (1), (2) and (3):

(1) $1.2 < H_{4MAX}/H_{4-1} < 1.6$ (2) $0.3 < f_T/f_1 < 1.0$ (3) $0.35 < |f_W/f_2| < 0.70$ where $H_{4MAX}$: the maximum height of the axial ray through the fourth lens group;

$H_{4-1}$: the height of the axial ray intercept at lens element 4-1 which is located closest to the object side in the fourth lens group;

$f_T$: the focal length of the overall system at the telephoto end;

$f_W$: the focal length of the overall system at the wide-angle end;

$f_1$: the focal length of the first lens group; and $f_2$: the focal length of the second lens group.

It is preferred that the fourth lens group comprises a subgroup 4a consisting of a first to a third lens element and a subgroup 4b having positive refractive power that is positioned subsequent to said subgroup 4a, and that said zoom lens system further satisfies the following conditions (4) and (5). The subgroup 4a may have either positive or negative refractive power.

(4) $|f_W/f_{4a}| < 0.20$ (5) $1.10 < f_B/f_{4b} < 1.65$ where $f_{4a}$: the focal length of the subgroup 4a;

$f_{4b}$: the focal length of the subgroup 4b; and $f_B$: the back focus calculated for air.

It is preferred that the zoom lens system of the invention further satisfy the following conditions (6) and (7):

(6) $4 < f_T/f_W < 8$ (7) $1.4 < |M_{2T}| < 2.5$ where $M_{2T}$: the lateral magnification produced by the second lens group at the telephoto end.

According to another aspect, the present invention provides a zoom lens system which has small distortion and yet experiences a small change in distortion during zooming. As in the first aspect, the second aspect employs a zoom lens system which comprises, in order from the object side, a first lens group having positive refractive power, a second lens group having a negative refractive power, a third lens group having negative refractive power, and a fourth lens group having positive refractive power, said first and fourth lens groups being fixed whereas said second and third lens groups are moved in the axial direction to effect zooming. The zoom lens system is characterized by satisfying the following conditions (6) and (7'):

(6) $4 < f_T/f_W < 8$ (7') $1.4 < |M_{2T}| < 2.0$

According to yet another aspect of the invention, there is provided a zoom lens system which comprises, in order from the object side, a first lens group having positive refractive power, a second lens group having negative refractive power, a third lens group having negative refractive power, and a fourth lens group having positive refractive power, said first and fourth lens groups being fixed whereas said second and third lens groups are moved in the axial direction to effect zooming, and which is characterized by satisfying the following conditions (6') and (7):

(6') $4.5 < f_T/f_W < 8$ (7) $1.4 < |M_{2T}| < 2.5$

BRIEF DESCRIPTION OF THE DRAWINGS

The invention will be more clearly understood from the following description in conjunction with the accompanying drawing, wherein.

DETAILED DESCRIPTION OF THE PREFERRED EMBODIMENTS

Figure 1:
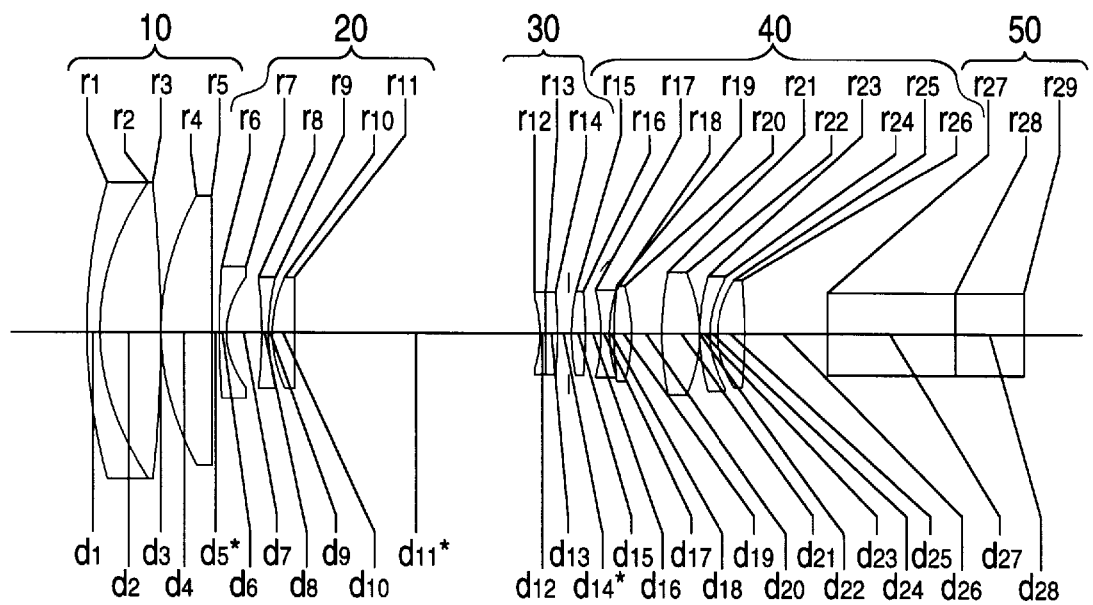
FIG. 1 shows the lens composition of a zoom lens system according to a first embodiment of the invention as it has been adjusted to the wide-angle end.

As described above, the present invention employs a zoom lens system of a "four group" type which comprises, in the order from the object side, a first lens group having positive refractive power, a second lens group having negative refractive power, a third lens group having negative refractive power, and a fourth lens group having positive refractive power, and in which zooming is effected by moving the second and third lens groups in the axial direction with the first and fourth lens groups being fixed.

Condition (1) must be satisfied in order to provide a long back focus. If its upper limit is exceeded, the lens system becomes bulky. If the lower limit of this condition is not reached, the required length of back focus is not attained.

Condition (2) must be satisfied in order to ensure high optical performance, particularly to achieve effective correction of spherical aberration. By setting the focal length of the first lens group to be greater than the focal length of the overall system at the telephoto end, high optical performance is assured, particularly in terms of effective correction of spherical aberration. If the upper limit of condition (2) is exceeded, the power of the first lens group becomes so great that higher-order aberrations will develop. If the lower limit of condition (2) is not reached, the overall length of the lens system becomes excessive.

Condition (3) must be satisfied in order to reduce the aberrational variations that will occur during zooming, particularly those in spherical aberration, coma and astigmatism. By reducing the power of the second lens group in such a way as to satisfy condition (3), the variations in spherical aberration, coma and astigmatism can be reduced. If the upper limit of condition (3) is exceeded, the power of the second lens group becomes so great that it becomes difficult to reduce the aberrational variations due to zooming. If the lower limit of condition (3) is not reached, the required zoom ratio is not attained or the movement of the second lens group becomes excessive.

Conditions (4) and (5) set forth the requirements that must be met by the powers of subgroups 4a and 4b of the fourth lens group in order to achieve a long back focus. If condition (4) is not satisfied, the subgroup 4a has such a great power that the height of the ray intercept at the subgroup 4b is small enough to introduce difficulty in attaining the required back focus.

If the upper limit of condition (5) is exceeded, the subgroup 4b has such a great power that spherical aberration and curvature of field will deteriorate. If the lower limit of condition (5) is not reached, it is difficult to attain the required back focus.

Conditions (6) and (7) must be satisfied in order to reduce not only distortion but also its change during zooming. Particularly for a zoom lens system having a zoom ratio in a range of 4 to 8, i.e., satisfying condition (6), condition (7) is preferably satisfied. If the upper limit of condition (6) is exceeded, the zoom ratio becomes so high that difficulty is introduced in reducing not only distortion but also its change. If the lower limit of condition (6) is not reached, it is impossible to attain a large zoom ratio.

If the upper limit of condition (7) is exceeded, the second lens group will have an increased difference in lateral magnification between the telephoto and wide-angle ends such that distortion at the wide-angle end takes on an increased negative value whereas distortion at the telephoto end takes on an increased positive value, thus producing an increased difference in distortion between the two extreme ends.

In order to further reduce the difference in distortion between the wide-angle and telephoto ends, the following condition (7') is preferably satisfied:

(7') $1.4 < |M_{2T}| < 2.0$

If the lower limits of conditions (7) and (7') are not reached, a large zoom ratio cannot be achieved or the overall length of the lens system is unduly great. If the upper limits of these conditions are not exceeded, distortion at the telephoto side will take on either a small positive value or a negative value, making it possible to reduce the difference from distortion at the wide-angle side.

With a zoom lens system having a zoom ratio in a range of 4.5 to 8, i.e., satisfying condition (6'), $M_{2T}$ does not have to satisfy the rigorous condition (7') but the less strict condition (7) needs to be satisfied in order to reduce not only distortion but also its change.

The present invention will now be described below by way of embodiments which include numerical data.

Embodiment 1

Figure 2:
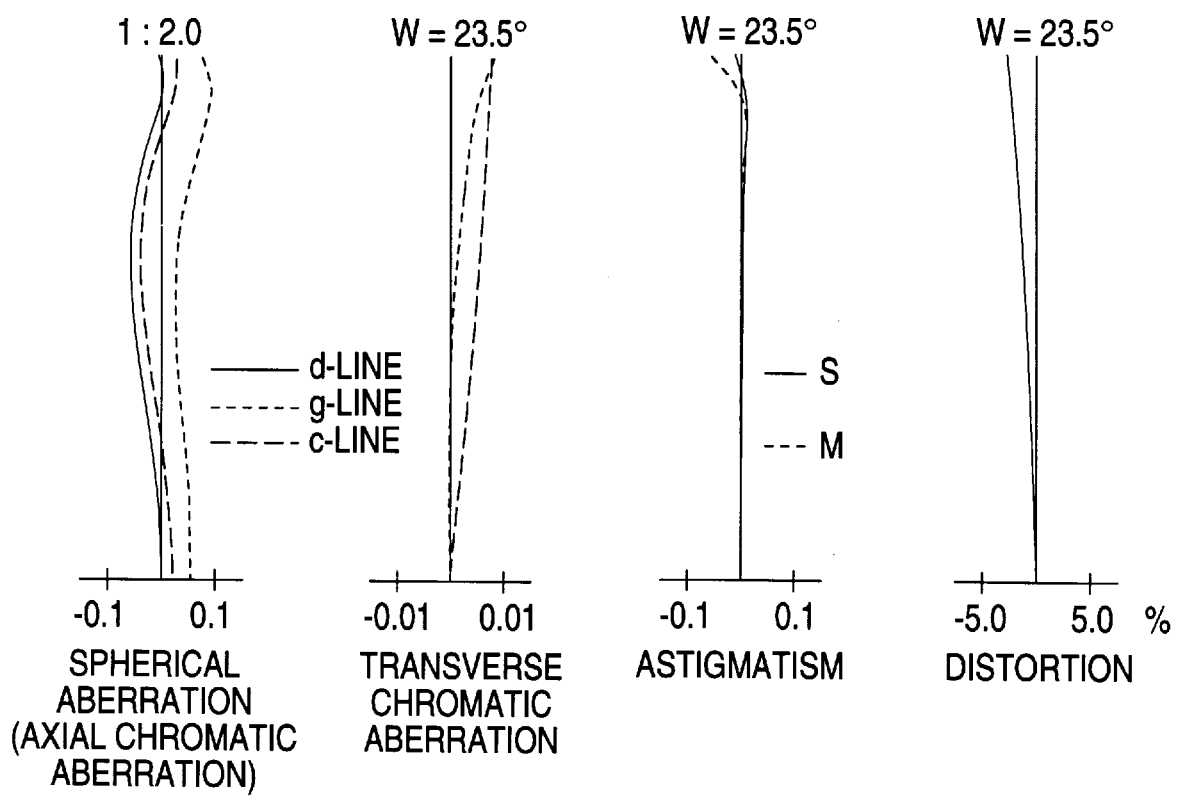
FIG. 2 is a diagram plotting the aberration curves obtained with the lens composition shown in FIG. 1.
Figure 3:
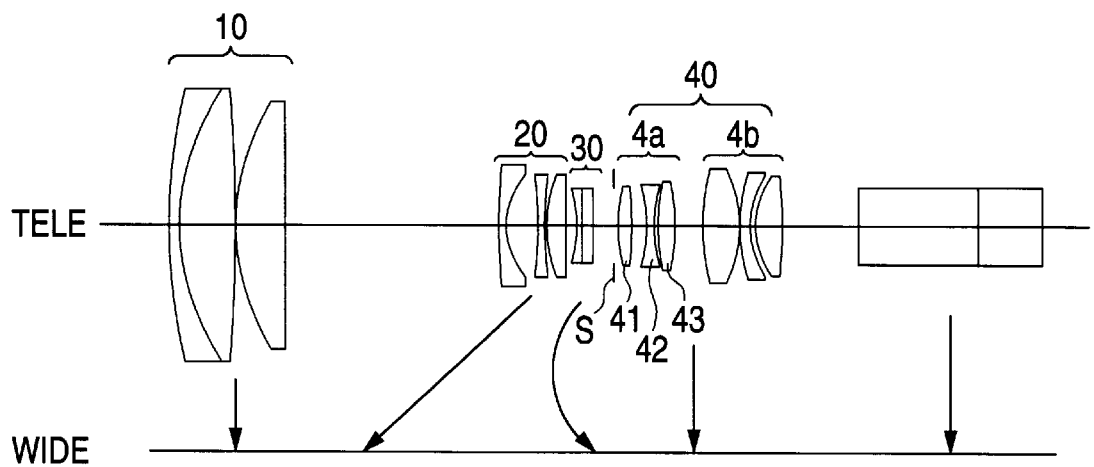
FIG. 3 shows the lens composition of the zoom lens system of the first embodiment at the telephoto end.
Figure 4:
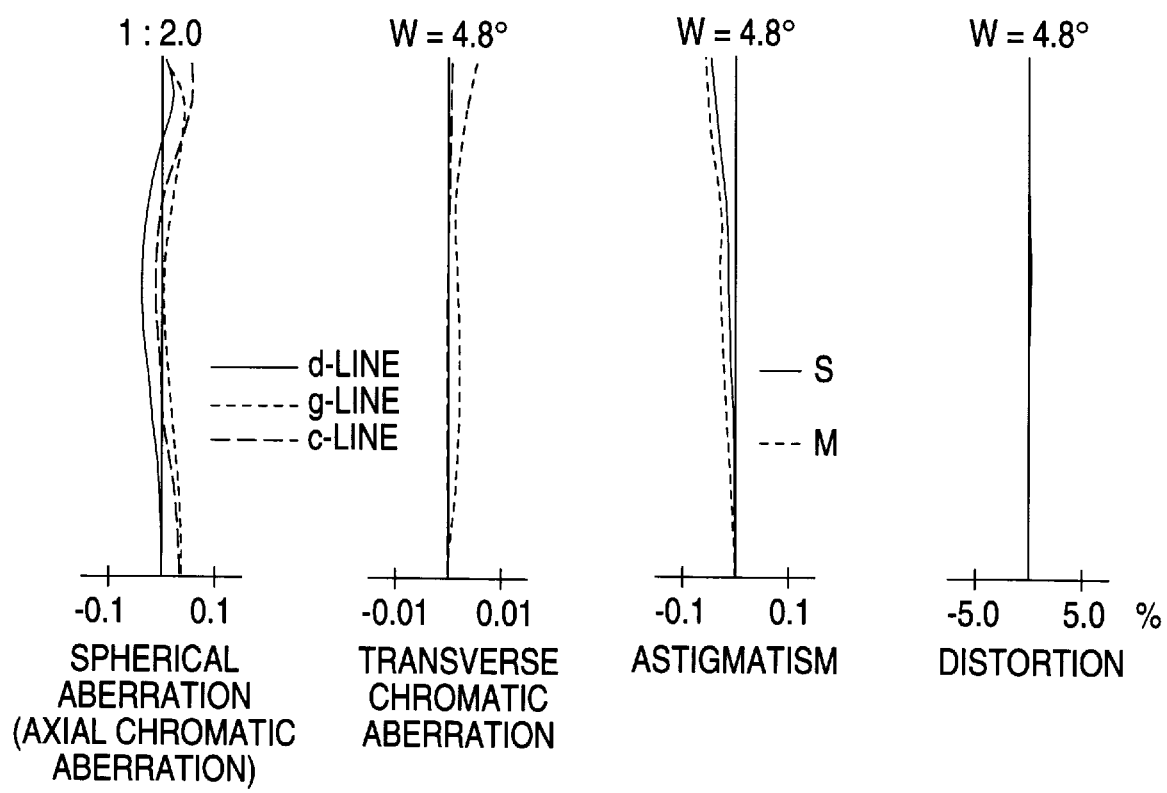
FIG. 4 is a diagram plotting the aberration curves obtained with the lens composition shown in FIG. 3.

FIGS. 1 to 4 show a first embodiment of the zoom lens system of the invention; FIGS. 1 and 3 show the lens compositions at the wide-angle and telephoto ends, respectively, and FIGS. 2 and 4 show various aberrations that are introduced at the wide-angle and telephoto ends, respectively. The zoom lens system of the first embodiment comprises, in order from the object side, a first lens group 10 having positive refractive power, a second lens group 20 having negative refractive power, a third lens group 30 having negative refractive power and a fourth lens group 40 having positive refractive power, with a color separation prism or filters 50 being positioned behind the fourth lens group 40. The last surface (r29) of the prism/filter unit 50 coincides with the imaging plane of a CCD. As clearly shown in FIG. 3, the fourth lens group 40 consists of a subgroup 4a and a subgroup 4b which has positive refractive power, and the subgroup 4a comprises, in the order from the object side, a first lens element 41, a second lens element 42, and a third lens element 43. A diaphragm stop S is an integral part of the fourth lens group 40. During zooming, the first lens group 10 and the fourth lens group 40 are fixed whereas the second lens group 20 and the third lens group 30 are moved. A typical zooming path is also drawn in FIG. 3. Focusing is performed with the first lens group 10.

The aberration curves of d-, g- and C-lines represent the axial chromatic aberrations as expressed by the spherical aberration and the transverse chromatic aberration of the respective wavelengths, and S and M designate "sagittal" and "meridional" rays, respectively.

The numerical data for the lens system of the first embodiment are set forth below in Table 1. In the following tables and the accompanying drawings, $F_{NO}$ represents the F number; f, the focal length; w, the half-view angle; and $f_B$, the back focus, i.e., the distance calculated for air from the last surface of the fourth lens group 40 to the imaging plane, which in this embodiment is coincident with the last surface of the prism/filter unit 50. Further, r represents the radius of curvature; d, the lens thickness or the distance between adjacent lens elements; Nd, the d-line refractive index; and vd, the d-line Abbe number. In the drawings, the asterisk * is attached to those lens-to-lens distances which vary during zooming.

TABLE 1

$F_{NO} = 1:2.0$
f = 13.00–30.00–65.00
W = 23.5–10.3–4.8
$f_B$ = 19.55 + (30.00/1.60342) + (16.20/1.51633) = 48.94
(calculated for air)

| Surface No. | r | d | Nd | vd |
|---|---|---|---|---|
| 1 | 148.499 | 2.80 | 1.80440 | 39.6 |
| 2 | 59.726 | 14.12 | 1.48749 | 70.2 |
| 3 | −392.313 | 0.15 | — | — |
| 4 | 59.571 | 11.79 | 1.49700 | 81.6 |
| 5 | 1453.494 | 1.60–34.96–54.84 | — | — |
| 6 | 175.832 | 1.80 | 1.80400 | 46.6 |
| 7 | 18.850 | 8.16 | — | — |
| 8 | −89.265 | 1.50 | 1.77250 | 49.6 |
| 9 | 61.283 | 0.70 | — | — |
| 10 | 34.806 | 5.00 | 1.84666 | 23.9 |
| 11 | 312.023 | 59.09–20.22–2.77 | — | — |
| 12 | −30.091 | 1.50 | 1.60311 | 60.7 |
| 13 | 355.513 | 2.60 | 1.75520 | 27.5 |
| 14 | −125.201 | 2.50–8.01–5.57 | — | — |
| Diaphragm stop | ∞ | 1.00 | — | — |
| 15 | 56.685 | 3.35 | 1.84666 | 23.8 |
| 16 | −112.151 | 3.82 | — | — |
| 17 | −34.325 | 1.80 | 1.83481 | 42.7 |
| 18 | 33.917 | 1.37 | — | — |
| 19 | 76.252 | 4.07 | 1.60311 | 60.7 |
| 20 | −47.887 | 6.93 | — | — |
| 21 | 49.581 | 9.24 | 1.49700 | 81.6 |
| 22 | −31.487 | 0.10 | — | — |
| 23 | 42.989 | 2.00 | 1.84666 | 23.8 |
| 24 | 21.276 | 1.73 | — | — |
| 25 | 23.986 | 6.60 | 1.62041 | 60.3 |
| 26 | −183.162 | 19.55 | — | — |
| 27 | ∞ | 30.00 | 1.60342 | 38.0 |
| 28 | ∞ | 16.20 | 1.51633 | 64.1 |
| 29 | ∞ | — | — | — |

Embodiment 2

Figure 5:
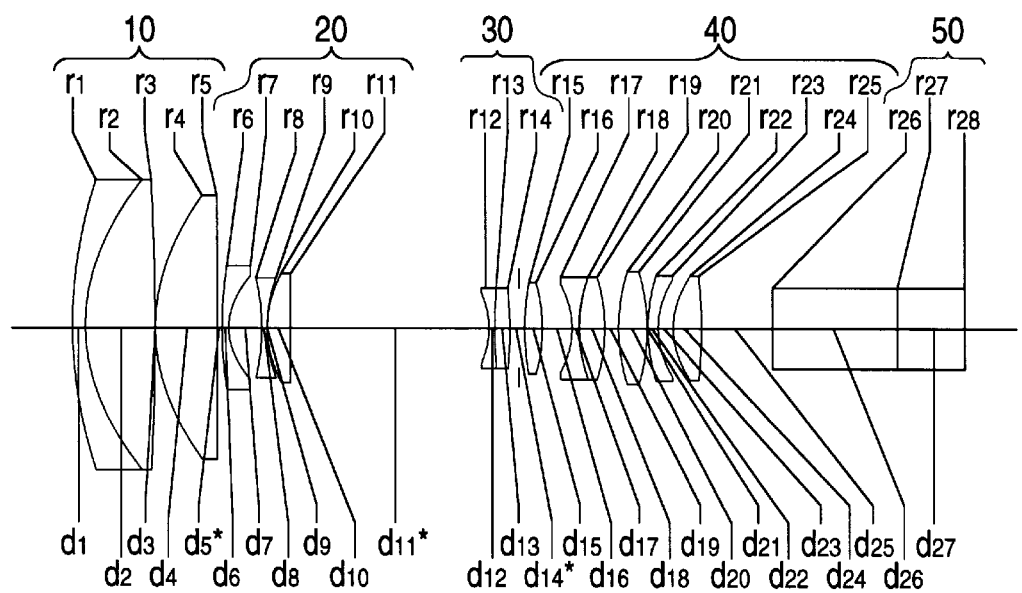
FIG. 5 shows the lens composition of a zoom lens system according to a second embodiment of the invention as it has been adjusted to the wide-angle end.
Figure 6:
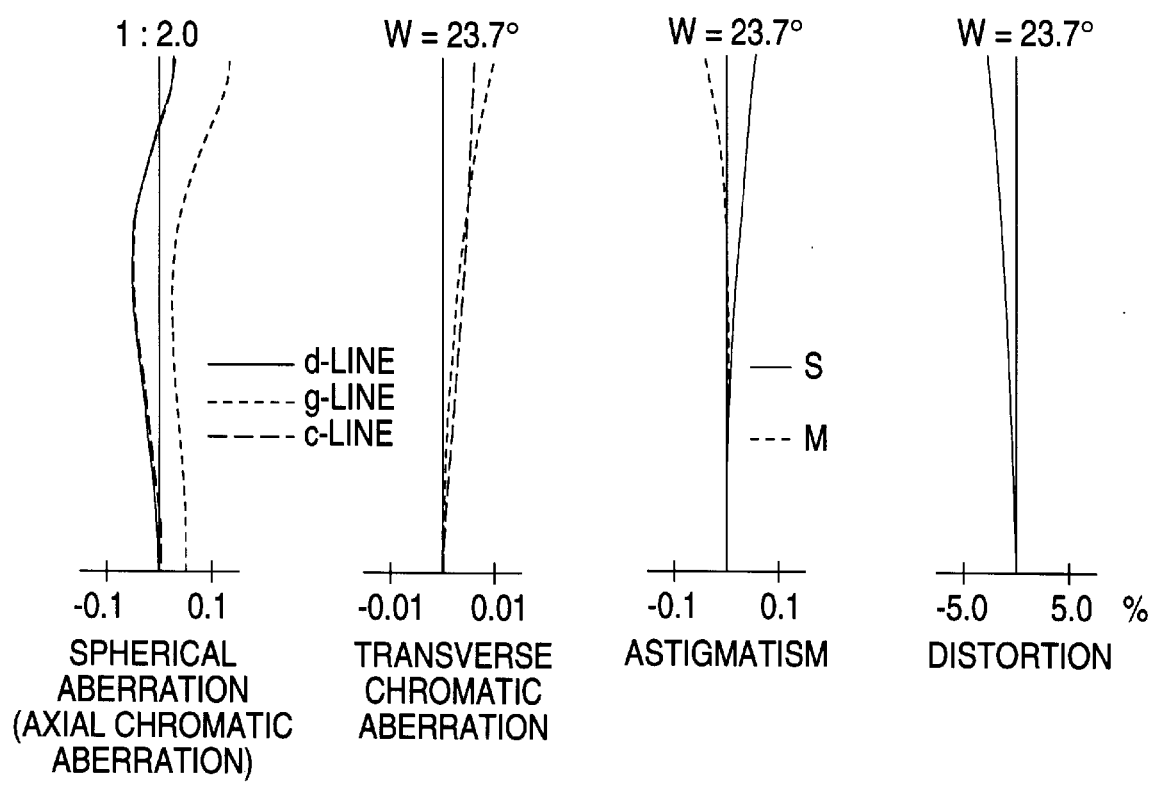
FIG. 6 is a diagram plotting the aberration curves obtained with the lens composition shown in FIG. 5.
Figure 7:
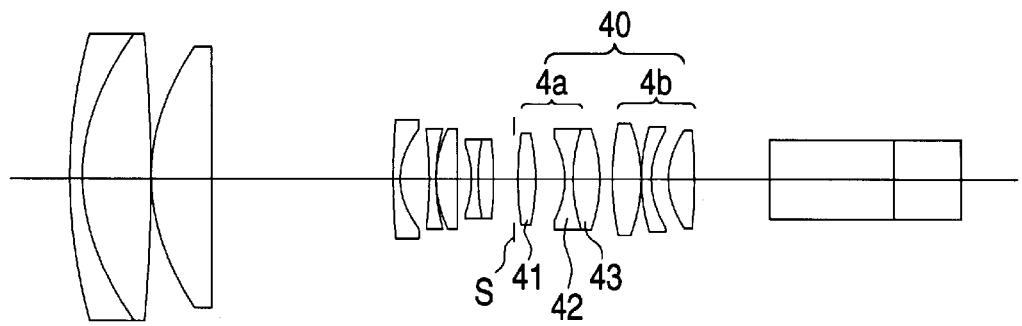
FIG. 7 shows the lens composition of the zoom lens system of the second embodiment at the telephoto end.
Figure 8:
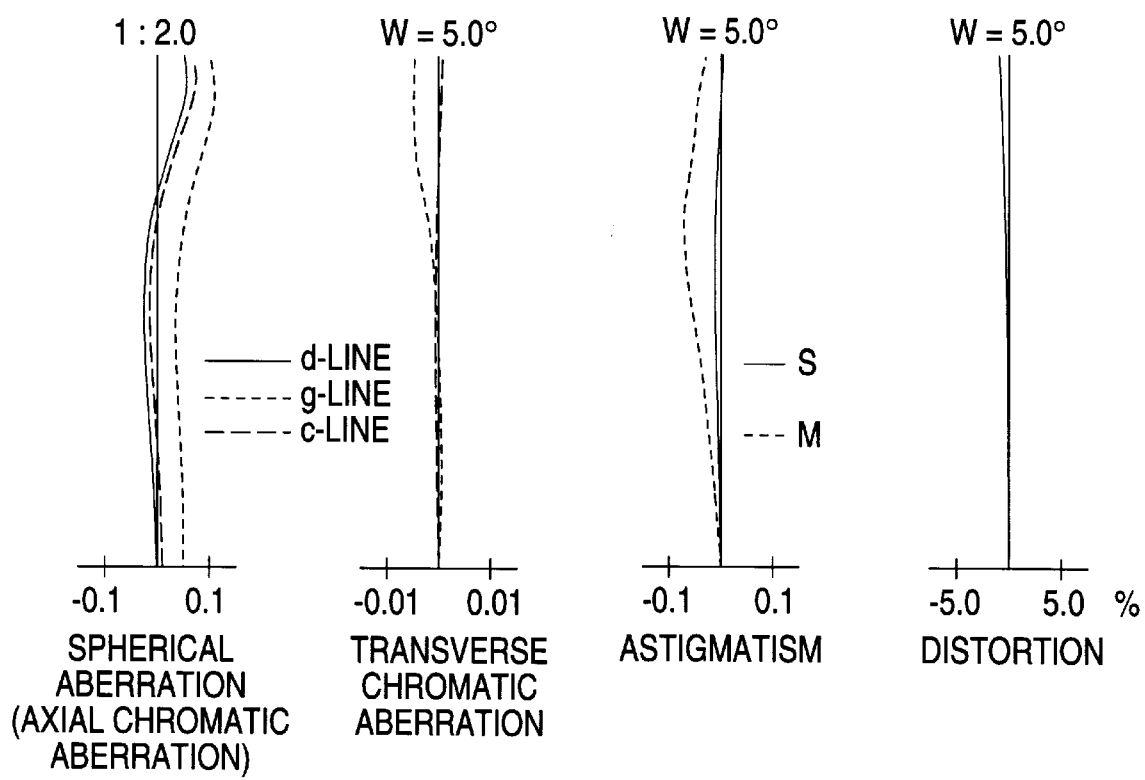
FIG. 8 is a diagram plotting the aberration curves obtained with the lens composition shown in FIG. 7.

FIGS. 5 to 8 show a second embodiment of the zoom lens system of the invention; FIGS. 5 and 7 show the lens compositions at the wide-angle and telephoto ends, respectively, and FIGS. 6 and 8 show various aberrations that are introduced at the wide-angle and telephoto ends, respectively. The basic lens composition and the zooming path are essentially the same as in the first embodiment except that the second lens element 42 and the third lens element 43 in the subgroup 4a of the fourth lens group 40 are bonded together. The last surface (r28) of the prism/filter unit 50 coincides with the imaging plane of the CCD. The specific numerical data for the lens system of this embodiment are set forth below in Table 2.

TABLE 2

$F_{NO} = 1:2.0$
f = 12.88–30.00–63.00
W = 23.7–10.5–5.0
$f_B$ = 17.96 + (30.00/1.60342) + (16.20/1.51633) = 47.35
(calculated for air)

| Surface No. | r | d | Nd | vd |
|---|---|---|---|---|
| 1 | 113.000 | 2.90 | 1.83400 | 37.2 |
| 2 | 51.700 | 16.55 | 1.48749 | 70.2 |
| 3 | −511.003 | 0.15 | — | — |
| 4 | 49.229 | 14.10 | 1.49700 | 81.6 |
| 5 | 600.000 | 1.65–28.51–44.04 | — | — |
| 6 | 129.576 | 1.70 | 1.81600 | 46.6 |
| 7 | 16.000 | 7.51 | — | — |
| 8 | −57.456 | 1.50 | 1.61800 | 63.4 |
| 9 | 39.113 | 0.10 | — | — |
| 10 | 27.915 | 5.30 | 1.80518 | 25.4 |
| 11 | 171.423 | 48.38–18.87–3.65 | — | — |
| 12 | −22.703 | 1.50 | 1.69680 | 55.5 |
| 13 | 68.381 | 3.55 | 1.66998 | 39.3 |
| 14 | −120.600 | 2.51–5.15–4.84 | — | — |
| Diaphragm stop | ∞ | 1.00 | — | — |
| 15 | 71.903 | 4.60 | 1.84666 | 23.8 |
| 16 | −40.836 | 6.93 | — | — |
| 17 | −23.707 | 1.80 | 1.83400 | 37.2 |
| 18 | 35.349 | 6.65 | 1.61800 | 63.4 |
| 19 | −35.349 | 2.90 | — | — |
| 20 | 40.768 | 7.15 | 1.49700 | 81.6 |
| 21 | −40.768 | 0.10 | — | — |
| 22 | 36.000 | 2.00 | 1.84666 | 23.8 |
| 23 | 18.860 | 3.86 | — | — |
| 24 | 23.205 | 6.70 | 1.60311 | 60.7 |
| 25 | −254.587 | 17.96 | — | — |
| 26 | ∞ | 30.00 | 1.60342 | 38.0 |
| 27 | ∞ | 16.20 | 1.51633 | 64.1 |
| 28 | ∞ | — | — | — |

Embodiment 3

Figure 9:
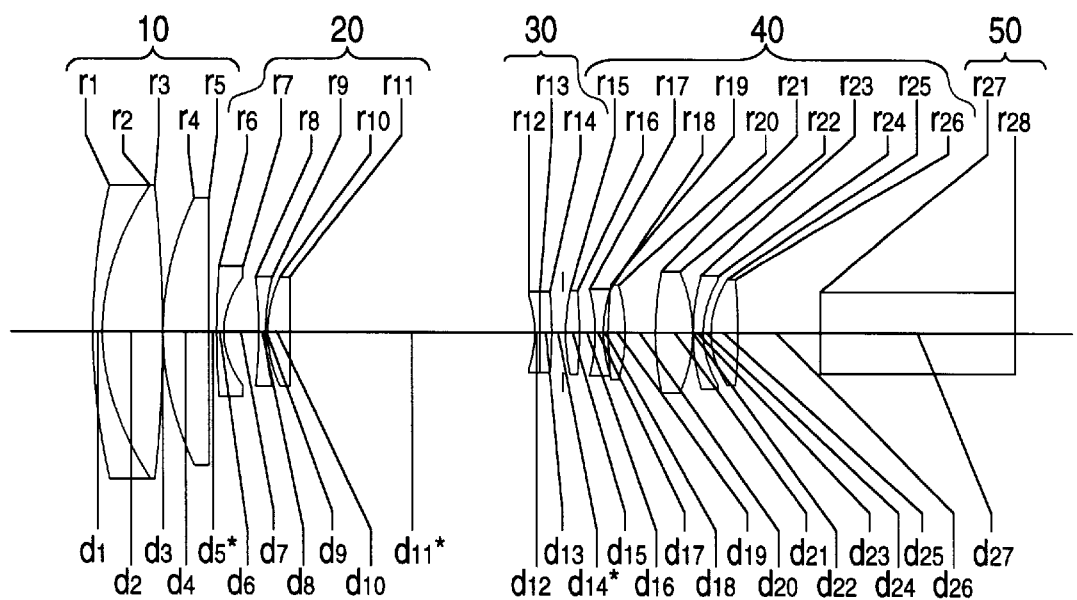
FIG. 9 shows the lens composition of a zoom lens system according to a third embodiment of the invention as it has been adjusted to the wide-angle end.
Figure 10:
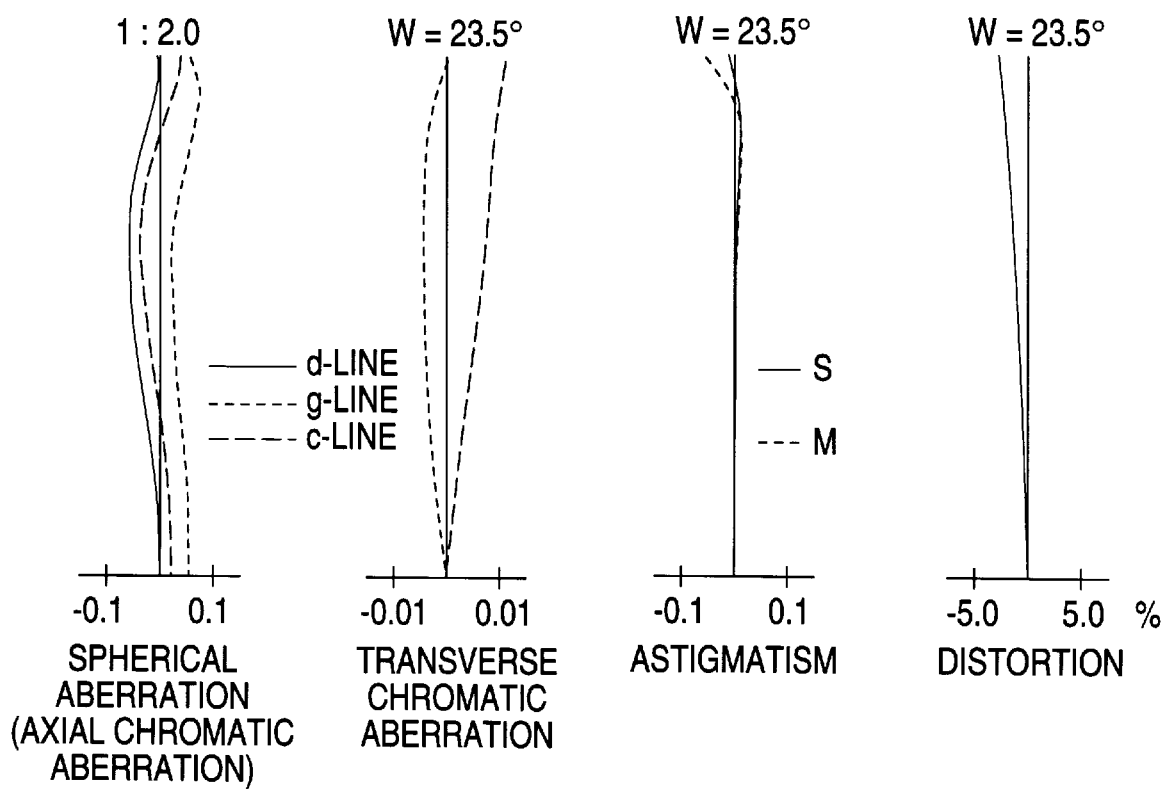
FIG. 10 is a diagram plotting the aberration curves obtained with the lens composition shown in FIG. 9.
Figure 11:
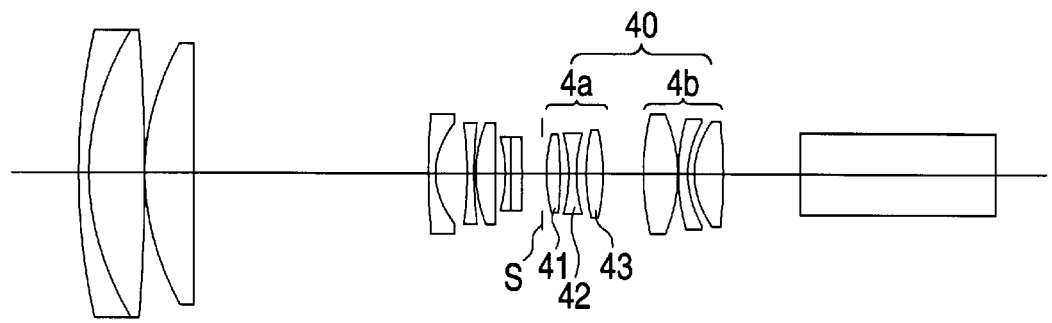
FIG. 11 shows the lens composition of the zoom lens system of the third embodiment at the telephoto end.
Figure 12:
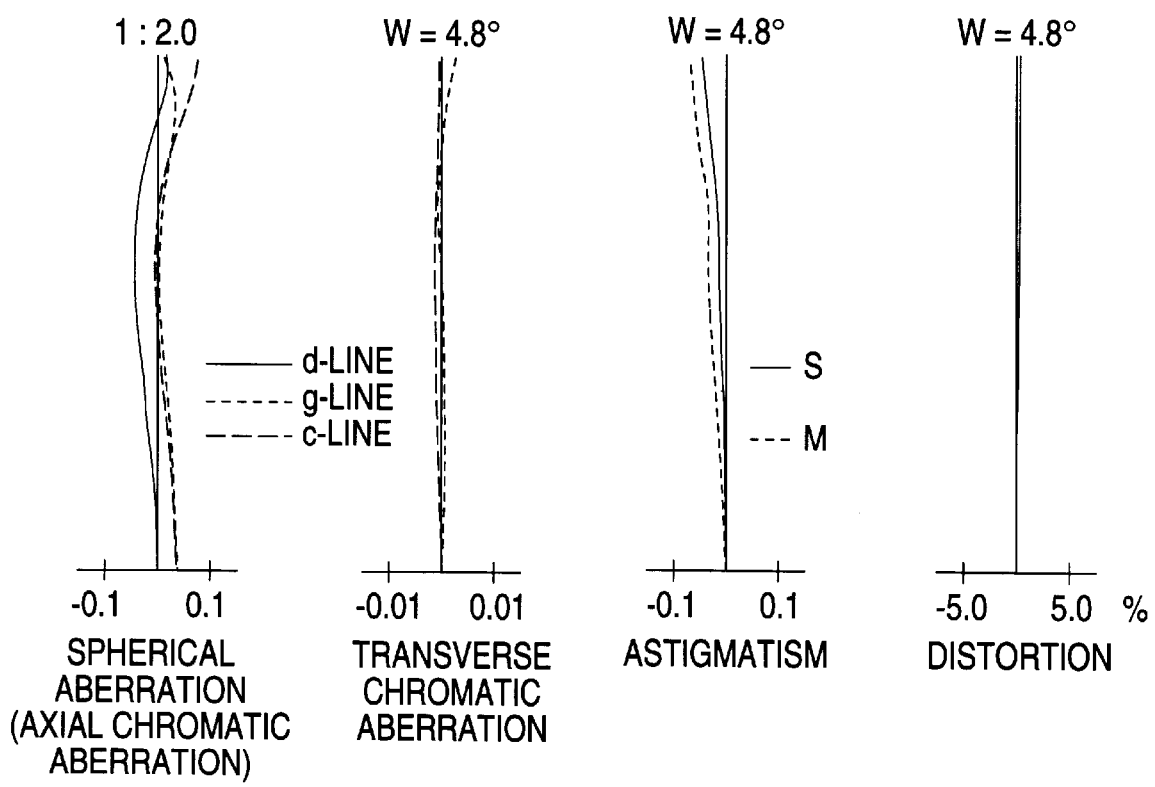
FIG. 12 is a diagram plotting the aberration curves obtained with the lens composition shown in FIG. 11.

FIGS. 9 to 12 show a third embodiment of the zoom lens system of the invention; FIGS. 9 and 11 show the lens compositions at the wide-angle and telephoto ends, respectively, and FIGS. 10 and 12 show various aberrations that are introduced at the wide-angle and telephoto ends, respectively. The basic lens composition and the zooming path are essentially the same as in the first embodiment. The last surface (r28) of the prism/filter unit 50 coincides with the imaging plane of the CCD. The specific numerical data for the lens system of this embodiment are set forth below in Table 3.

TABLE 3

$F_{NO}$ = 1:2.0
f = 13.00 - 30.00 - 65.00
w = 23.5 - 10.3 - 4.8

$f_B$ = 18.43 + (46.20/1.51633) = 48.90 (calculated for air)

| Surface No. | r | d | Nd | vd |
|---|---|---|---|---|
| 1 | 143.585 | 2.20 | 1.83400 | 37.2 |
| 2 | 61.583 | 13.66 | 1.48749 | 70.2 |
| 3 | −408.267 | 0.15 | — | — |
| 4 | 60.607 | 11.45 | 1.48749 | 70.2 |
| 5 | 2282.659 | 1.60-35.61-55.92 | — | — |
| 6 | 197.641 | 1.80 | 1.80400 | 46.6 |
| 7 | 19.836 | 7.96 | — | — |
| 8 | −101.851 | 1.50 | 1.77250 | 49.6 |

TABLE 3-continued

| | | | | |
|---|---|---|---|---|
| 9 | 67.480 | 0.69 | — | — |
| 10 | 35.651 | 5.00 | 1.84666 | 23.9 |
| 11 | 227.982 | 58.38-18.85-2.47 | — | — |
| 12 | −31.620 | 1.50 | 1.60311 | 60.7 |
| 13 | ∞ | 2.60 | 1.74077 | 27.8 |
| 14 | −117.975 | 2.50-8.02-4.09 | — | — |
| Diaphragm stop | ∞ | 1.00 | — | — |
| 15 | 52.730 | 3.35 | 1.84666 | 23.8 |
| 16 | −89.526 | 1.89 | — | — |
| 17 | −35.695 | 1.80 | 1.80440 | 39.6 |
| 18 | 29.266 | 2.30 | — | — |
| 19 | 66.093 | 4.38 | 1.60311 | 60.7 |
| 20 | −61.571 | 10.07 | — | — |
| 21 | 64.175 | 7.80 | 1.49700 | 81.6 |
| 22 | −31.020 | 0.10 | — | — |
| 23 | 45.221 | 2.00 | 1.84666 | 23.8 |
| 24 | 22.175 | 2.02 | — | — |
| 25 | 25.242 | 6.89 | 1.62041 | 60.3 |
| 26 | −145.689 | 18.43 | — | — |
| 27 | ∞ | 46.20 | 1.51633 | 64.1 |
| 28 | ∞ | — | — | — |

Embodiment 4

Figure 13:
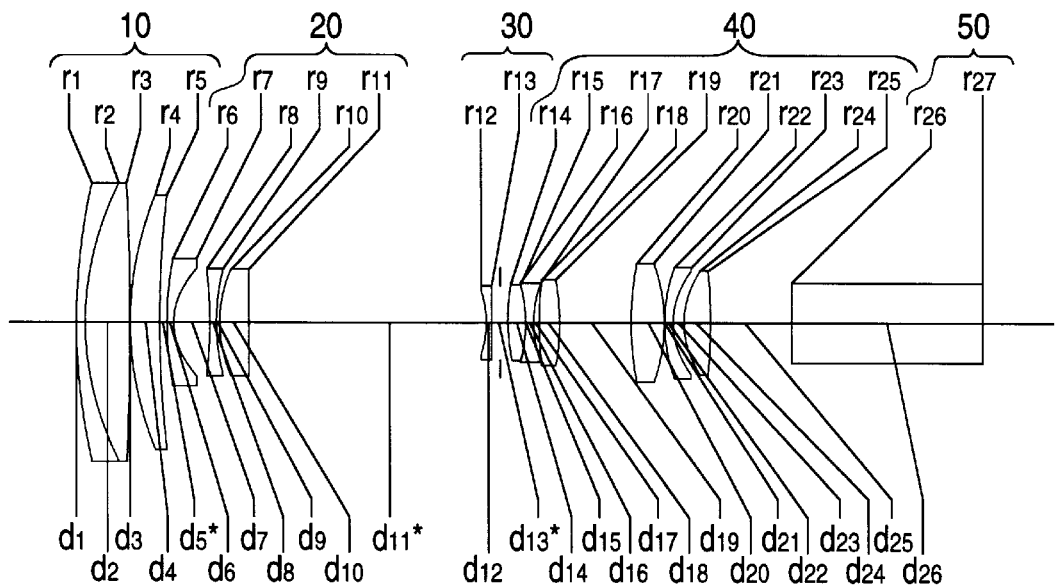
FIG. 13 shows the lens composition of a zoom lens system according to a fourth embodiment of the invention as it has been adjusted to the wide-angle end.
Figure 14:
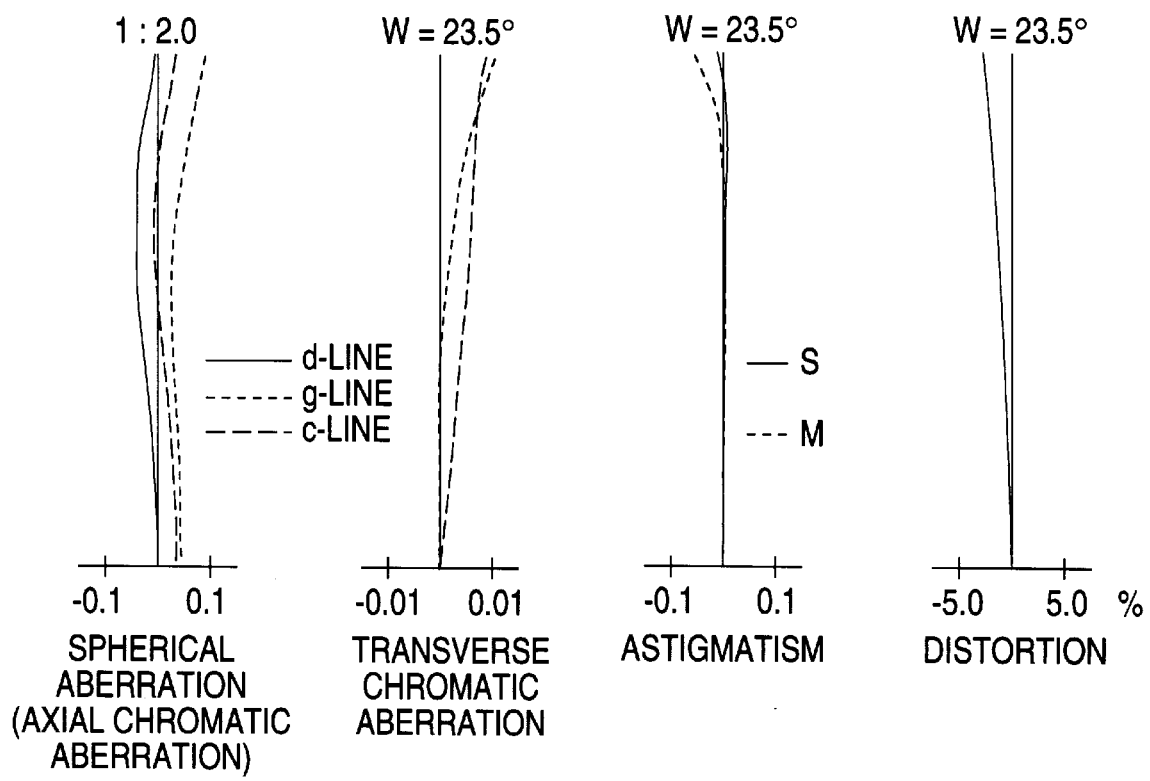
FIG. 14 is a diagram plotting the aberration curves obtained with the lens composition shown in FIG. 13.
Figure 15:
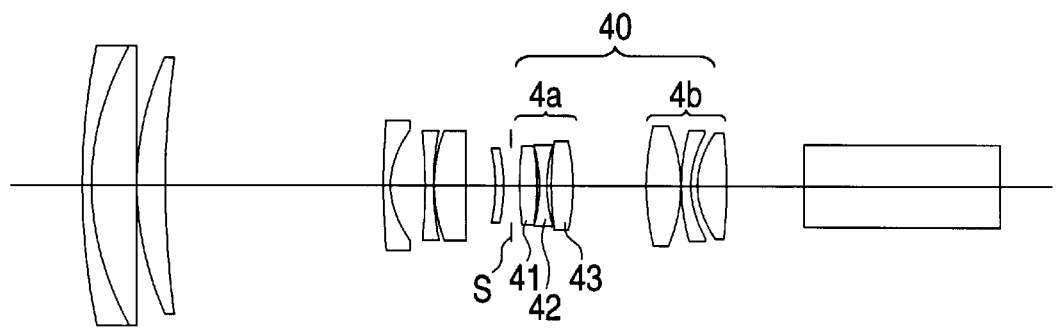
FIG. 15 shows the lens composition of the zoom lens system of the fourth embodiment at the telephoto end.
Figure 16:
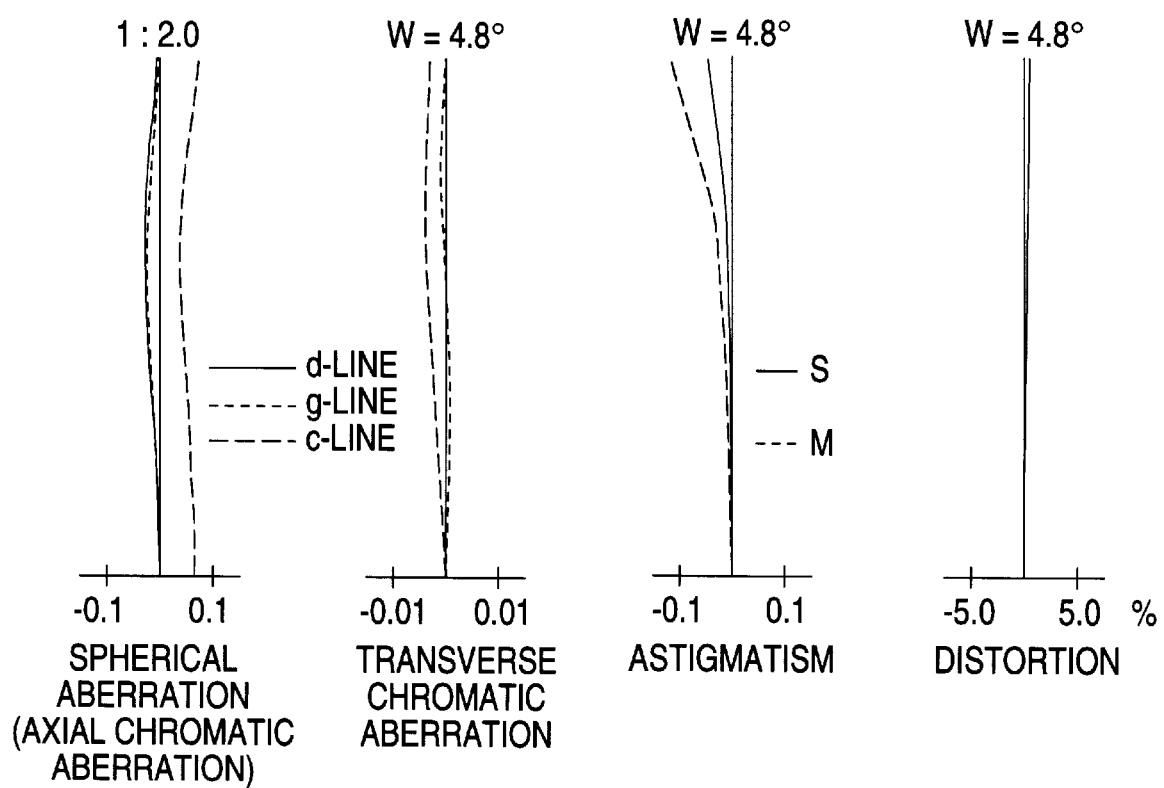
FIG. 16 is a diagram plotting the aberration curves obtained with the lens composition shown in FIG. 15.

FIGS. 13 to 16 show a fourth embodiment of the zoom lens system of the invention; FIGS. 13 and 15 show the lens compositions at the wide-angle and telephoto ends, respectively, and FIGS. 14 and 16 show various aberrations that are introduced at the wide-angle and telephoto ends, respectively. The basic lens composition and the zooming path are essentially the same as in the first embodiment except that the third lens group 30 consists of a single lens. The last surface (r27) of the filter/prism unit 50 coincides with the imaging plane of the CCD. The specific numerical data for the lens system of this embodiment are set forth below in Table 4.

TABLE 4

| $F_{NO}$ | = 1:2.0 |
|---|---|
| f | = 13.00 - 30.00 - 65.00 |
| w | = 23.5. - 10.3 - 4.8 |

$f_B = 18.50 + (46.20/1.51633) = 48.97$ (calculated for air)

| Surface No. | r | d | Nd | vd |
|---|---|---|---|---|
| 1 | 151.158 | 2.00 | 1.84666 | 23.8 |
| 2 | 74.166 | 10.65 | 1.62041 | 60.3 |
| 3 | −2128.924 | 0.15 | — | — |
| 4 | 74.515 | 7.22 | 1.77250 | 49.6 |
| 5 | 232.291 | 1.45-33.49-51.92 | — | — |
| 6 | 129.555 | 1.80 | 1.80400 | 46.6 |
| 7 | 18.820 | 8.58 | — | — |
| 8 | −72.695 | 1.50 | 1.77250 | 49.6 |
| 9 | 60.596 | 0.77 | — | — |
| 10 | 36.112 | 7.00 | 1.84666 | 23.9 |
| 11 | 1176.891 | 58.12-19.66-7.45 | — | — |
| 12 | −32.277 | 1.80 | 1.60311 | 60.7 |
| 13 | −71.012 | 2.00-8.42-2.21 | — | — |
| Diaphragm stop | ∞ | 1.85 | — | — |
| 14 | 84.665 | 4.01 | 1.84666 | 23.8 |
| 15 | −47.999 | 0.68 | — | — |
| 16 | −33.976 | 1.80 | 1.80440 | 39.6 |
| 17 | 36.370 | 1.14 | — | — |
| 18 | 103.966 | 5.08 | 1.62041 | 60.3 |
| 19 | −49.834 | 17.87 | — | — |
| 20 | 56.361 | 7.29 | 1.48749 | 70.2 |
| 21 | −39.626 | 0.10 | — | — |
| 22 | 56.308 | 2.00 | 1.84666 | 23.8 |
| 23 | 23.872 | 2.87 | — | — |
| 24 | 28.101 | 6.53 | 1.62041 | 60.3 |

TABLE 4-continued

| 25 | −94.625 | 18.50 | — | — |
|---|---|---|---|---|
| 26 | ∞ | 46.20 | 1.51633 | 64.1 |
| 27 | ∞ | — | — | — |

Table 5 below sets forth the zoom ratios and the numerical data associated with conditions (1) to (7) in the first to fourth embodiments.

TABLE 5

| | Emb. 1 | Emb. 2 | Emb. 3 | Emb. 4 |
|---|---|---|---|---|
| Zoom ratio | 5 | 5 | 5 | 5 |
| Condition (1) | 1.389 | 1.245 | 1.463 | 1.409 |
| Condition (2) | 0.606 | 0.685 | 0.597 | 0.644 |
| Condition (3) | 0.472 | 0.613 | 0.443 | 0.463 |
| Condition (4) | 0.025 | 0.182 | 0.029 | 0.023 |
| Condition (5) | 1.619 | 1.425 | 1.547 | 1.359 |
| Condition (6) (6') | 5.008 | 4.891 | 5.017 | 4.992 |
| Condition (7) (7') | 1.834 | 1.547 | 2.035 | 2.215 |

Obviously, the numerical data of the first fourth embodiments all satisfy conditions (1) to (6), (6'), and (7). The first and second embodiments also satisfy condition (7'). In addition, the diagrams plotting the aberration curves obtained with the zoom lens system of the first to fourth embodiments show that they are effectively corrected for various aberrations. Particularly in the first and second embodiments, the distortion is small and yet experiences only a small variation during zooming (i.e., the difference in distortion between the wide-angle and telephoto ends is small).

The present invention provides a zoom lens system which has a long back focus and yet exhibits high optical performance over the full zooming range. The invention also provides a zoom lens system that has the additional feature of experiencing a small change in distortion during zooming.

We claim:

1. A zoom lens system comprising, in order from the object side, a first lens group having positive refractive power, a second lens group having negative refractive power, a third lens group having negative refractive power, and a fourth lens group having positive refractive power, said first and fourth lens groups being fixed during zooming whereas said second and third lens groups are moved in an axial direction to effect zooming, wherein said zoom lens system satisfies the following conditions (1), (2) and (3):

(1) $1.2 < H_{4MAX}/H_{4-I} < 1.6$
   (2) $0.3 < f_T/f_1 < 1.0$
   (3) $0.35 < |f_W/f_2| < 0.70$ where $H_{4MAX}$ is the maximum height of an axial ray through the fourth lens group, $H_{4-I}$ is the height of the axial ray intercept at lens element 4–1 which is located closest to the object side in the fourth lens group, $f_T$ is the focal length of the overall system at the telephoto end, $f_W$ is the focal length of the overall system at the wide-angle end, $f_1$ is the focal length of the first lens group, and $f_2$ is the focal length of the second lens group.

2. A zoom lens system according to claim 1, which further satisfies the following conditions (6) and (7):

(6) $4 < f_T/f_W < 8$
   (7) $1.4 < |M_{2T}| < 2.5$ where $M_{2T}$ is the lateral magnification produced by the second lens group at the telephoto end.

3. A zoom lens system comprising, in order from the object side, a first lens group having positive refractive power, a second lens group having negative refractive power, a third lens group having negative refractive power and a fourth lens group having positive refractive power, said first and fourth lens groups being fixed during zooming whereas said second and third lens groups are moved in an axial direction to effect zooming, wherein said zoom lens system satisfies the following conditions (6) and (7'):

(6) $4 < f_T/f_W < 8$ (7') $1.4 < |M_{2T}| < 2.0$ where $f_T$ is the focal length of the overall system at the telephoto end, $f_W$ is the focal length of the overall system at the wide-angle end, and $M_{2T}$ is the lateral magnification produced by the second lens group at the telephoto end.

4. A zoom lens system comprising, in order from the object side, a first lens group having positive refractive power, a second lens group having negative refractive power, a third lens group having negative refractive power, and a fourth lens group having positive refractive power, said first and fourth lens groups being fixed during zooming whereas said second and third lens groups are moved in an axial direction to effect zooming, wherein said zoom lens system satisfies the following conditions (1), (2) and (3):

(1) $1.2 < H_{4MAX}/H_{4-1} < 1.6$ (2) $0.3 < f_T/f_1 < 1.0$ (3) $0.35 < |f_W/f_2| < 0.70$ where $H_{4MAX}$ is the maximum height of an axial ray through the fourth lens group, $H_{4-1}$ is the height of the axial ray intercept at lens element 4–1 which is located closest to the object side in the fourth lens group, $f_T$ is the focal length of the overall system at the telephoto end, $f_W$ is the focal length of the overall system at the wide-angle end, $f_1$ is the focal length of the first lens group, and $f_2$ is the focal length of the second lens group;

wherein said fourth lens group comprises a subgroup 4a consisting of first to third lens elements and a subgroup 4b having positive refractive power that is positioned on the image side of said subgroup 4a, said zoom lens system further satisfying the following conditions (4) and (5):

(4) $|f_W/f_{4a}| < 0.20$ (5) $1.10 < f_B/f_{4b} < 1.65$ where $f_{4a}$ is the focal length of the subgroup 4a, $f_{4b}$ is the focal length of the subgroup 4b, and $f_B$ is the back focus calculated for air.

5. A zoom lens system according to claim 4, which further satisfies the following conditions (6) and (7):

(6) $4 < f_T/f_W < 8$ (7) $1.4 < |M_{2T}| < 2.5$ where $M_{2T}$ is the lateral magnification produced by the second lens group at the telephoto end.

6. A zoom lens system comprising, in order from the object side, a first lens group having positive refractive power, a second lens group having negative refractive power, a third lens group having negative refractive power, and a fourth lens group having positive refractive power, said first and fourth lens groups being fixed during zooming whereas said second and third lens groups are moved in an axial direction to effect zooming, wherein said zoom lens system satisfies the following conditions (1), (2) and (3):

(1) $1.2 < H_{4MAX}/H_{4-1} < 1.6$ (2) $0.3 < f_T/f_1 < 1.0$ (3) $0.35 < |f_W/f_2| < 0.70$ where $H_{4MAX}$ is the maximum height of an axial ray through the fourth lens group, $H_{4-1}$ is the height of the axial ray intercept at lens element 4–1 which is located closest to the object side in the fourth lens group, $f_T$ is the focal length of the overall system at the telephoto end, $f_W$ is the focal length of the overall system at the wide-angle end, $f_1$ is the focal length of the first lens group, and $f_2$ is the focal length of the second lens group, wherein said fourth lens group comprises a subgroup 4a consisting of first to third lens elements and a subgroup 4b having positive refractive power that is positioned on the image side of said subgroup 4a.

7. A zoom lens system comprising, in order from the object side, a first lens group having positive refractive power, a second lens group having negative refractive power, a third lens group having negative refractive power, and a fourth lens group having positive refractive power, said first and fourth lens groups being fixed during zooming whereas said second and third lens groups are moved in an axial direction to effect zooming, wherein said zoom lens system satisfies the following conditions (1), (2) and (3):

(1) $1.2 < H_{4MAX}/H_{4-1} < 1.6$ (2) $0.3 < f_T/f_1 < 1.0$ (3) $0.35 < |f_W/f_2| < 0.70$ where $H_{4MAX}$ is the maximum height of an axial ray through the fourth lens group, $H_{4-1}$ is the height of the axial ray intercept at lens element 4–1 which is located closest to the object side in the fourth lens group, $f_T$ is the focal length of the overall system at the telephoto end, $f_W$ is the focal length of the overall system at the wide-angle end, $f_1$ is the focal length of the first lens group, and $f_2$ is the focal length of the second lens group;

wherein said fourth lens group comprises a subgroup 4a consisting of first to third lens elements and a subgroup 4b having positive refractive power that is positioned on the image side of said subgroup 4a, said zoom lens system further satisfying the following conditions (4), (5), (6) and (7):

(4) $|f_W/f_{4a}| < 0.20$ (5) $1.10 < f_B/f_{4b} < 1.65$ (6) $4 < f_T/f_W < 8$ (7) $1.4 < |M_{2T}| < 2.5$ where $f_{4a}$ is the focal length of the subgroup 4a, $f_{4b}$ is the focal length of the subgroup 4b, $f_B$ is the back focus calculated for air, and $M_{2T}$ is the lateral magnification produced by the second lens group at the telephoto end.

8. A zoom lens system according to claim 7, wherein said zoom lens system further satisfies the following condition:

(6') $4.5 < f_T/f_W < 8$.

9. A zoom lens system according to claim 7, wherein said zoom lens system further satisfies the following condition:

(7') $1.4 < |M_{2T}| < 2.0$.

* * * * *